United States Patent [19]

Wheeler

[11] Patent Number: 4,701,398
[45] Date of Patent: Oct. 20, 1987

[54] PHOTOGRAPHIC FILM CONTAINING DIRECT POSITIVE DYES MADE FROM 3-INDOLIZINE CARBOXALDEHYDE

[75] Inventor: James W. Wheeler, Fairport, N.Y.

[73] Assignee: E. I. Du Pont de Nemours and Company, Wilmington, Del.

[21] Appl. No.: 839,581

[22] Filed: Mar. 14, 1986

Related U.S. Application Data

[60] Division of Ser. No. 719,053, Apr. 2, 1985, Pat. No. 4,614,801, which is a continuation-in-part of Ser. No. 598,187, Apr. 9, 1984, abandoned.

[51] Int. Cl.[4] .......................... G03C 1/22; G03C 1/485
[52] U.S. Cl. ..................................... 430/510; 430/533; 430/592; 430/593; 430/596; 430/597; 430/581
[58] Field of Search ............... 430/581, 596, 593, 510, 430/533, 592, 597, 598, 5.7

[56] References Cited

U.S. PATENT DOCUMENTS

| | | | |
|---|---|---|---|
| 2,405,106 | 7/1946 | Widmer et al. | 95/8 |
| 2,409,612 | 10/1946 | Brooker et al. | 260/240 |
| 2,511,222 | 6/1950 | Sprague et al. | 260/240 |
| 2,571,775 | 10/1951 | Sprague | 260/240.65 |
| 2,622,082 | 12/1952 | Sprague | 260/240.9 |
| 2,666,761 | 1/1954 | Heseltine et al. | 260/240.1 |
| 2,706,193 | 4/1955 | Sprague | 260/240.4 |
| 3,260,601 | 7/1966 | Bailey | 546/121 |
| 3,483,196 | 12/1969 | Jenkins et al. | 260/240.4 |
| 3,505,070 | 4/1970 | Litzerman et al. | 430/597 |
| 3,650,758 | 3/1972 | Gilman, Jr. | 96/101 |
| 3,925,085 | 12/1975 | Sato et al. | 96/101 |
| 3,941,602 | 3/1976 | Depoorter et al. | 96/101 |
| 4,147,554 | 4/1979 | Tanaka et al. | 430/582 |
| 4,355,098 | 10/1982 | Wheeler | 430/510 |

OTHER PUBLICATIONS

Borrows, Holland & Kenyon, "The Chemistry of the Pyrrolines, Part I, 2-Methyl- and 2-Phenyl-Pyrrocoline" J. Chemical Soc., 1946, pp. 1069–1075.
Stepanov et al., Chem. Abs. 60, 695 (1963).

Primary Examiner—Won H. Louie

[57] ABSTRACT

A new group of cyanine and merocyanine spectral sensitizing dyes based on derivatives of 3-indolizine carboxaldehyde is particularly useful in sensitizing a direct positive silver halide emulsion to orange and red.

5 Claims, No Drawings

PHOTOGRAPHIC FILM CONTAINING DIRECT POSITIVE DYES MADE FROM 3-INDOLIZINE CARBOXALDEHYDE

CROSS REFERENCE TO RELATED APPLICATION

Divisional of Ser. No. 719,053 Apr. 2, 1985, now U.S. Pat. No. 4,614,801 which is a continuation-in-part of Ser. No. 598,187, Apr. 9, 1984, abandoned.

FIELD OF THE INVENTION

This invention is directed to a new group of cyanine and merocyanine spectral sensitizing dyes which can be made from 3-indolizine carboxaldehyde, and more specifically to direct positive emulsions sensitized therewith.

BACKGROUND ART

The prior art describes a host of dye systems which can be used in the photographic industry to extend the spectral sensitivity of a light-sensitive silver halide emulsion, for both negative-working and positive-working (direct positive) systems. A light-sensitive silver halide emulsion is spectrally sensitized when it is rendered more sensitive by addition of dyes which absorb certain portions of the spectrum. Dyes are needed which sensitize direct positive emulsions in the red and orange spectral region for films which are exposed with an orange or red phosphor or laser. Previously known orange and red direct positive dyes are symmetrical carbocyanines and generally give low speed and low contrast.

SUMMARY OF THE INVENTION

This invention is directed to a new group of spectral sensitizing dyes which can be made from derivatives of 3-indolizine carboxaldehyde, and which sensitize direct positive silver halide emulsions to orange and red light, to provide photographic films which demonstrate high speed and high gradient. These dyes are selected from the group consisting of a cyanine having the structure:

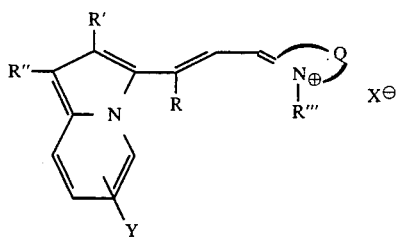

I.

wherein R is H or alkyl of 1–4 carbon atoms; R' and R" are H, alkyl of 1–7 carbon atoms, substituted alkyl, aryl, or substituted aryl; R''' is H, alkyl of 1–7 carbon atoms, alkenyl of not more than 7 carbon atoms, substituted alkyl, aryl, or substituted aryl; Y is hydrogen, alkyl of 1–4 carbon atoms, $NO_2$ or halogen; Q represents sufficient carbon, nitrogen, and/or sulfur atoms to form a 5- or 6-member heterocyclic, or substituted heterocyclic ring; and X is an anion; and, a merocyanine having the structure:

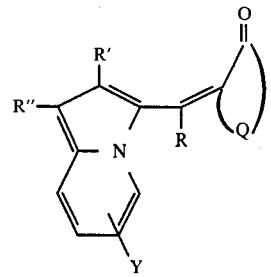

II.

wherein R is H or alkyl of 1–4 carbon atoms: R', R" and Y are as defined above; and Q represents sufficient carbon, nitrogen, and/or sulfur atoms to form a 5- or 6-member heterocyclic or substituted heterocyclic ring, with the proviso that when Q in formula I or II forms a substituted heterocyclic ring, the substitutents may be such as to form a fused ring system.

Where any of R', R" and R''' represents substituted aryl, e.g., substituted phenyl, the substituent may, for example, be alkoxy (e.g., methoxy) or nitro. R' preferably represents methyl, phenyl, p-methoxyphenyl or p-nitrophenyl. R" preferably represents hydrogen. R''' preferably represents alkyl or alkenyl containing up to 4 carbon atoms, e.g., methyl or 2-propenyl. The anion is preferably 4-methylbenzenesulfonate or tetraphenylborate.

DETAILS OF THE INVENTION

Dyes from the above referenced structures are usually made up as dilute alcohol solution and are added to a gelatino-silver halide emulsion in amounts ranging from 0.01 g to 1.2 g per 1.5 moles of silver halide.

Typical positive-working, gelatino-silver halide emulsions useful in the practice of this invention are legion in number and description. It is preferred to use silver bromoiodide prepared from a balanced, double-jet-type precipitation (about 0.2μ edge length) containing about $8 \times 10^{-5}$ mole percent rhodium in about 190 g gelatin per mole of silver halide. These emulsions are fogged with cesium thiadecaborane and hydrochloroauric acid and contain sensitizing adjuvants such as polyethylene oxides. The emulsion is usually coated at about 0.4–3 g Ag/m² coating weight on a paper or a polyester base having an antihalation backing layer, and the emulsion hardened with formaldehyde.

Some typical dye structures representative of the dyes of this invention include:

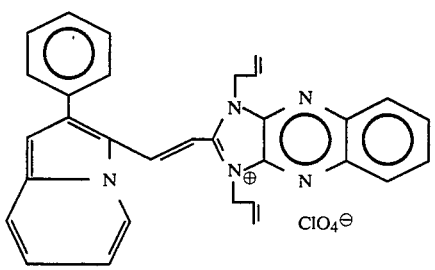

(A)

-continued (B) 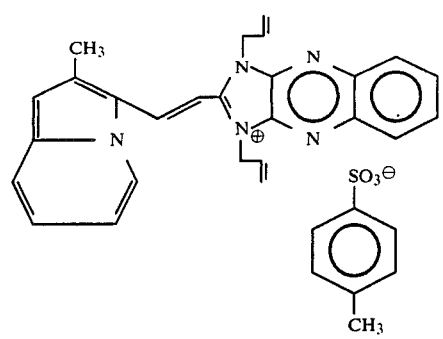

(C) 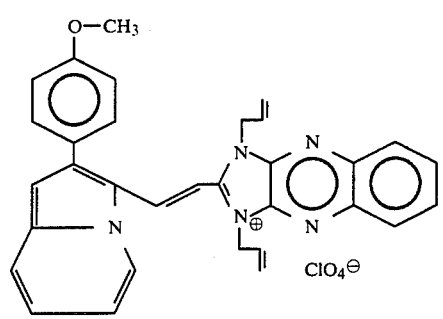

(D) 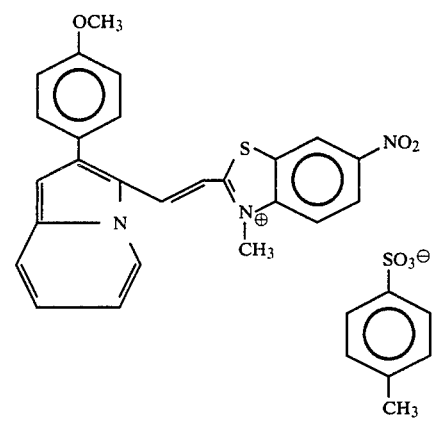

(E) 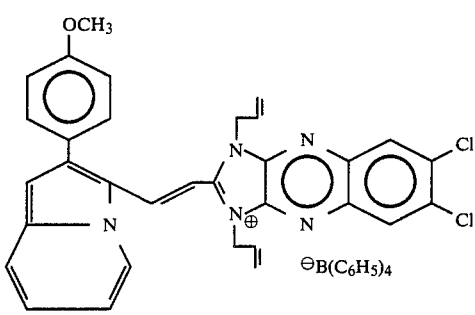

(F) 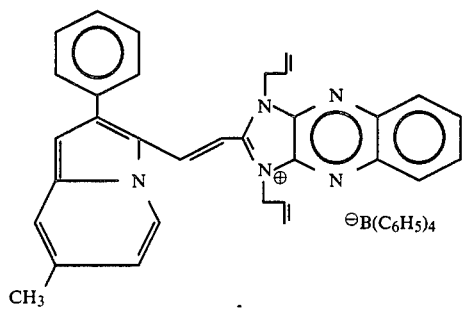

-continued (G) 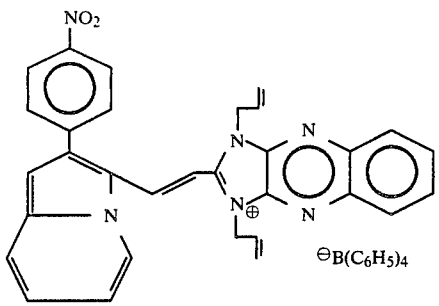

(H) 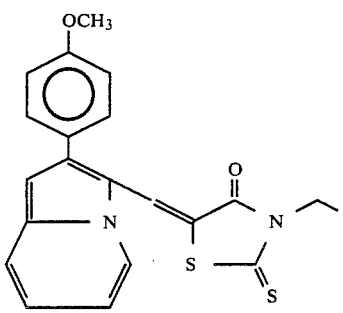

As stated above, these emulsions may be coated on a polyester or paper support, but it is preferable to use 0.004 inch thick polyethylene terephthalate film coated on both sides with the subbing layer of Rawlins, U.S. Pat. No. 3,443,950 (vinylidene chloride/alkyl acrylate/itaconic acid copolymer mixed with an alkyl acrylate and/or methacrylate polymer) overcoated with a thin substratum of gelatin. A conventional anti-halation layer is preferably applied on one side and the sensitized, fogged emulsion of this invention on the opposite side of the film support. After drying, film strip samples of the resulting photographic film can be tested by a $10^{-3}$ second exposure through a $\sqrt{2}$ step wedge on the Mark 6 Sensitometer made by E.G. And G. Co. which uses the GE type FT-118 Xenon Flash Tube. After exposure, the strips may be developed in any conventional developer (e.g., mixed hydroquinone/-phenidone developing agent). One preferred developer contains the following ingredients:

| Ingredient | Amt. (g/l) |
|---|---|
| Sodium Metaborate | 19.8 |
| Sodium Sulfite | 244.4 |
| Sodium Carbonate | 35.7 |
| Sodium Hydroxide (45% soln.) | 151.9 |
| 5-Nitrobenzimidazole | 0.09 |
| Benzotriazole | 0.92 |
| 1-Phenyl-5-Mercaptobenzo-triazole | 0.10 |
| Hydroquinone | 111.0 |
| Phenidone | 5.95 |
| Potassium Bromide | 5.35 |
| pH | 11.6–12.0 |

Additional wetting agents, sequestrants, and adjuvants may also be incorporated in the developer, as known to those skilled in the art. Typically, the exposed strips are developed for about 30 seconds in the above developer at 95° F. followed by a 50 second water wash, and fixed for 30 seconds in a conventional ammonium thiosulfate fixer at a pH of about 5.4 and a temperature of 95° F.

The fixed element is then washed 30 seconds in water and dried.

In addition, the dyes of this invention can be used as a dye pair to supersensitize a direct positive emulsion, especially when combined with the dyes of U.S. Pat. No. 4,355,098. Supersensitization usually results in speed and spectral extension of the emulsion beyond that which might be predicted from a simple arithmetic addition of the individual effects produced by each dye alone. Supersensitization is an old phenomenon in the negative-working silver halide industry. A good review of this subject is found, for example, in Gilman et al, J. Photogr. Sci., Vol. 21, pages 53–70 (1973). Supersensitization of direct positive emulsions using dye pairs is also known in the prior art.

This invention will now be illustrated by the following specific examples:

DYE INTERMEDIATE PREPARATION b 2-phenyl-3-indolizine carboxaldehyde

A slurry of 10 g of 2-phenylindolizine in 60 ml of DMF was added to a solution of 10 ml of phosphorus oxychloride in 30 ml of N,N-dimethylformamide (DMF) at 10°–20° C. After the reaction solution was stirred at room temperature for two hours, it was poured onto 20 g of ice.

60 g of 25 percent sodium hydroxide solution was added and the resulting mixture was heated to 60° C. After cooling to room temperature, the mixture was filtered, and the solid collected was washed with water. The air-dried solid weighed 11 g.

2-(4-methoxyphenyl) indolizine 10 g of 2-picoline and 25 g of 4-methoxyphenacyl bromide in 35 ml of ethanol were refluxed for 18 hours. The reaction solution was concentrated under reduced pressure to give a solid, which was dissolved in 350 ml of water. After the aqueous solution was extracted with three 35 ml portions of ether, 35 g of sodium bicarbonate was added to the aqueous solution and was refluxed two hours. The cooled reaction mixture was filtered to give 20 g of product.

2-(4-methoxyphenyl)-3-indolizine carboxaldehyde

A slurry of 20 g of 2-(4-methoxy phenyl) indolizine in 35 ml of DMF was added to a solution of 10 ml of phosphorus oxychloride in 30 ml of DMF at 10–20° C. After the reaction solution was stirred at 40° for 40 min., it was added to 200 g of ice. 120 g of 25 percent sodium hydroxide solution was added and the resulting mixture was heated to 55° C., cooled, and filtered. The air-dried product weighed 23 g.

DYE PREPARATION

Dye A 1.2 g of 2-phenyl-3-indolizine carboxaldehyde, 2.2 g of 1,3-di-2-propenyl-2-methylimidazo[4,5-b]quinoxalinium salt, 4-methylbenzenesulfonic acid (1:1) in 10 ml of acetic anhydride were refluxed for three min. The cooled reaction solution was added to 100 ml of ether. The oil obtained was dissolved in 40 ml of methanol. 5 g of sodium perchlorate in 40 ml of water: methanol (1:1) was added to form the crystalline dye. The crystals were filtered, washed with methanol, and air dried to give 2.1 g ($\lambda$ max=565 nm in methanol).

Dye B 1 g of 2-methyl-3-indolizine carboxaldehyde, 2.2 g of 1,3-di-2-propenyl-2-methylimidazo[4,5-b]quinoxalinium salt, 4-methylbenzene sulfonic acid (1:1) in 10 ml of acetic anhydride were refluxed for 2 min. The reaction solution was added to 100 ml of ether and triturated. The resulting dye crystals were filtered and dried to give 0.6 g ($\lambda$ max=520 nm in methanol).

Dye C 1.3 g. of 2-(4-methoxy phenyl)-3-indolizine carboxaldehyde, 2.2 g of 1,3-di-2-propenyl-2-methylimidazo[4,5-b]quinoxalinium salt, 4-methylbenzenesulfonic acid (1:1) in 10 ml of acetic anhydride were refluxed for six min. The cooled reaction solution was added to 100 ml of ether. The solvent was decanted from the dark oil. The oil was dissolved in 20 ml of methanol. 5 g of sodium perchlorate in 20 ml of methanol was added to give a crystalline product. The dye was filtered and air dried to give 1.8 g ($\lambda$ max=570 nm in methanol).

Dye D 0.76 g of 2,3-dimethyl-6-nitrobenzothiazolium salt, 4-methylbenzenesulfonic acid (1:1), 0.65 g of 2-(4-methoxyphenyl)-3-indolizine carboxaldehyde, one drop of piperidine, and 6 ml of ethanol were refluxed for five min. The dye crystallized upon cooling and was filtered and air dried to give 1.0 g. ($\lambda$ max=570 nm in methanol).

Dye E 0.5 g of 2-(4-methoxyphenyl)-3-indolizine carboxaldehyde, 0.9 g of 5,6-dichloro-1,3-di-2-propenyl-2-methylimidazo[4,5-b] quinoxalinium salt, 4-methylbenzenesulfonic acid (1:1) in 3.6 ml of acetic anhydride were refluxed for three min. A solution of one gram of sodium tetraphenylborate in 5 ml of methanol was added. The solvent was decanted from the gum.

Triturating the gum with 20 ml of methanol gave crystalline dye. The filtered and air-dried dye weighed 1.2 g ($\lambda$ max=580 nm in methanol).

Dye H 0.8 g of N-ethyl rhodanine and 1.3 g of 2-(4-methoxy phenyl)-3-indolizine carboxaldehyde in 5 ml of acetic anhydride were refluxed for five min. The dye (0.5 g) was filtered from the cooled reaction mixture.

EXAMPLES 1–4

A cubic grain silver iodobromide emulsion containing ca. 4.75 weight percent silver, 4.0 weight percent gelatin, 98% bromide and 2% iodide, and having about $8 \times 10^{-5}$ mole percent rhodium therein, was fogged with cesium thiadecaborane and hydrochloroauric acid to achieve optimum direct positive sensitivity. The standard wetting agents, hardeners antifoggants and the like were also added. The emulsion was then split into four portions, and one of the dyes of this invention added to each portion as shown. The dyes were made up at 35 mg dye/20 ml of methanol. After addition of the dyes, each part of emulsion was then coated on polyethylene terephthalate film at about 28 mg/dm² coating weight and dried. Strips of these films were tested by exposure to a point source of incandescent light through a $\sqrt{2}$ step wedge for about 20 seconds. The strips were developed in a conventional mixed hydroquinone/phenidone developer, fixed, washed, and dried. The following results were achieved.

| Example | Dye Structure | Rel Speed | Dmax | Dmin | Spectral Sens. (λmax in nm) |
|---|---|---|---|---|---|
| 1 | A | 0.84 | 5.15 | 0.17 | 600 |
| 2 | B | 3.41 | 5.21 | 0.05 | 585 |
| 3 | G | 0.87 | 4.92 | 0.18 | 595 |
| 4 | E | 1.80 | 6.39 | 0.05 | 575 |

These results demonstrate that the dyes can sensitize a direct positive emulsion with good speed and high Dmax. Dye B is preferred.

EXAMPLES 5-9

An emulsion similar to that described in Examples 1-4 was prepared and split into five portions. Various dyes of this invention were added in supersensitizing combination with a prior art dye taken from U.S. Pat. No. 4,355,098 with the following structure:

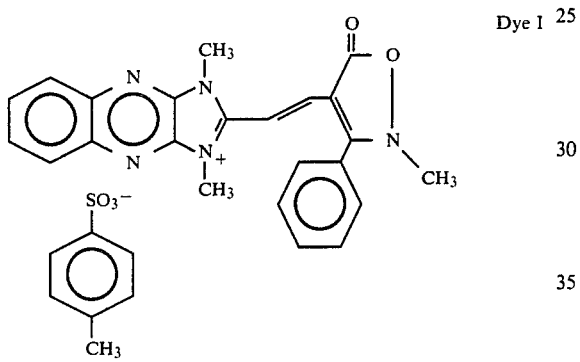

Dye I

The dyes were added at 30 mg for the dyes of this invention and 90 mg for Dye I, above, dissolved in methanol. One portion had Dye I above as control. The emulsions were coated, dried, sampled, exposed, developed, fixed, and washed per Example 1-4 with the following results:

| Example | Dye Used | Rel Speed | Dmax | Dmin |
|---|---|---|---|---|
| 5 | A | 6.66 | 4.27 | 0.04 |
| 6 | B | 12.12 | 4.86 | 0.04 |
| 7 | G | 5.64 | 4.81 | 0.05 |
| 8 | E | 7.30 | 4.71 | 0.04 |
| 9 | I-control | 4.15 | 5.17 | 0.04 |

In a like manner, other dyes described above and fitting the broad disclosure of this invention, were tested either singly or as a supersensitizer dye pair. All functioned well for purposes of this invention.

I claim:

1. A direct positive photographic film comprising a support, a fogged gelatino-silver halide emulsion on said support characterized in that the emulsion contains an effective amount of a spectral sensitizing dye selected from the group consisting of a cyanine having the structure:

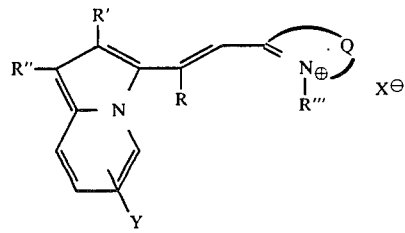

I.

wherein R is H or alkyl of 1-4 carbon atoms; R' and R" are H, alkyl of 1-7 carbon atoms, substituted alkyl, aryl, or substituted aryl; R''' is H, alkyl of 1-7 carbon atoms, alkenyl of not more than 7 carbon atoms, substituted alkyl, aryl, or substituted aryl; Y is hydrogen, alkyl of 1-4 carbon atoms, $NO_2$ or halogen; Q represents sufficient carbon, nitrogen, and/or sulfur atoms to form a 5- or 6-member heterocyclic ring, or substituted heterocyclic ring; and X is an anion; and, a merocyanine having the structure:

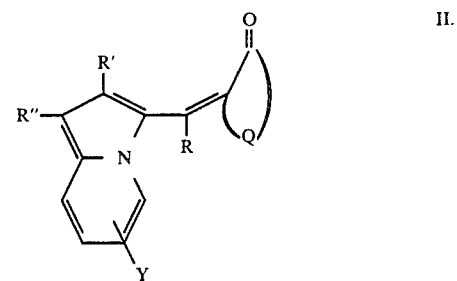

II.

wherein R is H or alkyl of 1-4 carbon atoms; R', R" and Y are as defined above; and Q represents sufficient carbon, nitrogen, and/or sulfur atoms to form a 5- or 6-member heterocyclic or substituted heterocyclic ring with the proviso that when Q in formula I and II forms a substituted heterocyclic ring, the substituents may be such as to form a fused ring system.

2. The film of claim 1 wherein the support is paper or a polyester base having an antihalation backing layer, and the emulsion is coated thereon at about 0.4-3 g Ag/m².

3. The film of claim 1 wherein one or more auxiliary layers are present.

4. The film of claim 1 wherein the dye has the formula

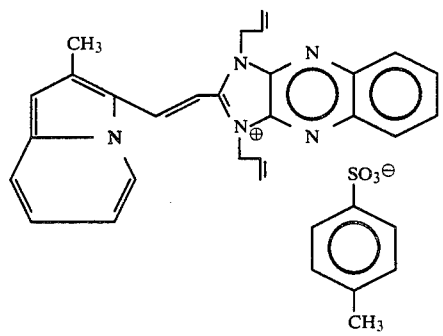

5. The film according to claim 1 wherein the dye is taken from the group consisting of -continued
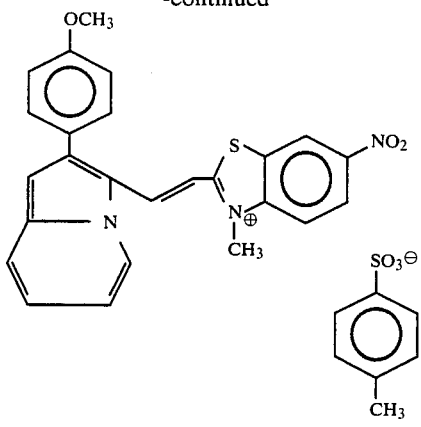
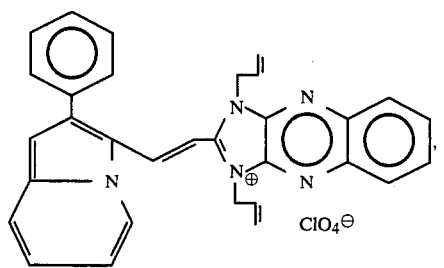
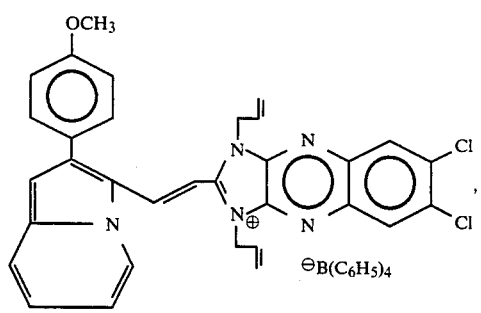
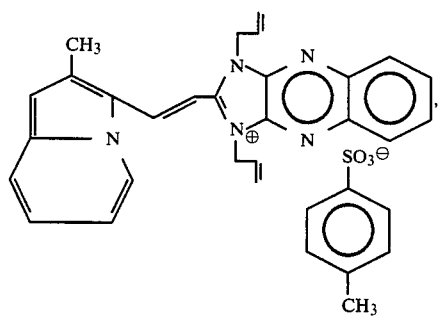
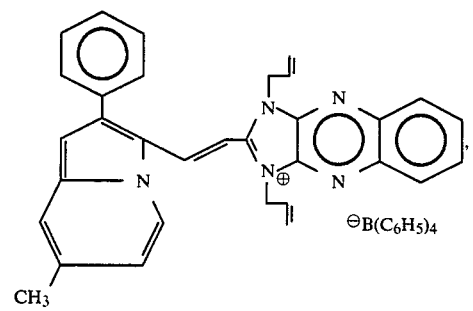
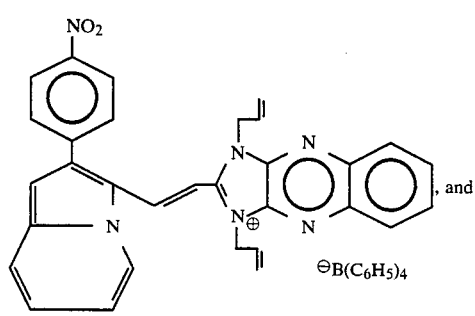, and
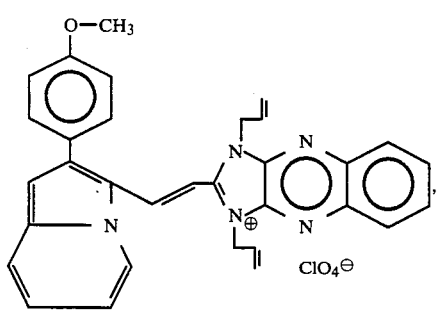
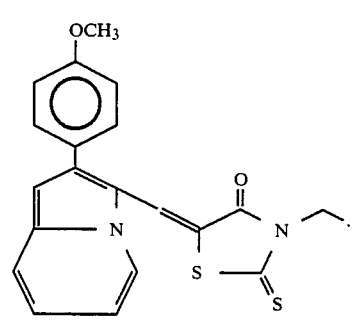
* * * * *